Patented May 11, 1943

2,319,142

UNITED STATES PATENT OFFICE 2,319,142

METHOD OF PREPARING PHENOLIC RESIN COMPOSITIONS

Hans H. Lebach, Newark, Del., assignor to Haveg Corporation, Newark, Del., a corporation of Delaware No Drawing. Application January 17, 1941, Serial No. 374,944

8 Claims. (Cl. 260—38)

This invention relates to new and useful improvements in phenolic resin compositions and more particularly to phenolic resin cements of the cold-setting acid-hardened type.

Phenolic resin compositions have found wide application and use for cementing together bricks and tiles particularly in acid-proof structures of an industrial nature such as large tanks, vats, and the like, for providing coherent protective linings or for molding solid articles. The success of such compositions depends upon the uniform mixture of the phenolic compound with the necessary hardening agent since, in cases where the hardening agent is not properly distributed uniformly in the resinous binder, the latter does not harden uniformly throughout all portions and serious difficulty through leakage or collapse of the structure may very soon occur. The hardening agents employed for such resinous cements are substances acid in themselves or which yield acid upon reaction with the phenolic resins.

Since the two components, the phenolic resin and the acid-hardening agent, are mixed together, a substance may be incorporated in the mixture, which substance undergoes a distinct change of color dependent on the mixing of the components. Preferably the substance is mixed with one of the components and may be incorporated with the phenolic resin, or with the hardening agent, or, as will hereinafter appear, a coloring material may be formed by reaction of a substance incorporated in the resinous composition and a substance associated with the hardening agent. By the present invention, it is possible to determine immediately when the hardening agent is uniformly distributed in the mixture by the uniformity of the resulting color of said mixture.

Conversely, if the hardening agent is not properly distributed uniformly in the resinous composition that fact will at once be indicated by the absence of the color in those portions of the mixture deficient in hardening agent with the result that the mixture will appear streaked and non-uniform in color. In such cases the composition can be subjected to further mixing before use until its color becomes uniform, thus indicating that it is uniformly mixed.

I am aware that it has been proposed heretofore to add certain dyes to phenolic resins for the purpose of defining or indicating the end point of the heat-hardening reaction, and that the addition of certain substances to lacquers and the like has been proposed whereby a color change develops as the final hardening reaction takes place under heat; but so far as I am aware, I am the first to discover that the addition of a suitable substance to acid-hardening phenolic compositions may be employed effectively to indicate the extent of distribution of the hardening agent in such compositions in such a manner that, if need be, any non-uniformity therein can be corrected by further mixture before the composition hardens.

With the foregoing observations in mind, an object of the invention, therefore, is to provide a novel process or method for determining the uniformity or non-uniformity of mixtures of a phenolic resin compound and the acid-hardening agent prior to using the same.

Another object of the invention is to provide a process or method as stated which is fool-proof and entirely accurate and reliable in use.

These and other objects of the invention and the various features and details of its practice and operation are hereinafter fully set forth and described.

The invention contemplates the use of a suitable substance which will undergo a substantial change in color when the resin and hardening agent are mixed in order that the extent to which the hardening agent has been mixed with the phenolic resin may be immediately determined.

The phenolic resins employed may be of the formaldehyde type, or may be any other phenolic condensation product which is convertible into an infusible and insoluble final product by the interaction with an acid or a substance yielding acid. Herein, the terms "acid" and "acid-hardening" agent include acid itself, acid salts and acid-yielding substances. In many cases, filler substances such as siliceous earth, asbestos, quartz, silica and like substances that will impart body and strength to the resulting final product are added to these phenolic resins.

The hardening agents may be an acid, such as hydrochloric and sulphuric acid, or an acid salt such as sodium bisulphate, ferric chloride, and aluminum chloride, or any substance which, upon reaction with the phenolic resin, will yield an acid. The chlorides and sulfochlorides of organic acids, such as acetyl or benzoyl chloride and the toluenesulpho-chlorides are illustrative of substances which yield acid upon reaction with a phenolic resin.

The substance added to indicate the degree of uniformity of the hardening agent in the resinous binder may be any substance which exhibits a noticeable change in color when the resinous composition and acid are mixed. Preferably, a material which changes noticeably in color when subjected to the action of acid is employed. Certain groups of synthetic dye substances have been found especially desirable for use since they exhibit a very distinct color change in the presence of acid, and also because only minute quantities need be used. This is an advantage since the small amounts necessary do not adversely affect the properties of the hardened final product. Included in these more desirable groups of synthetic dyes are those of the benzidin class such as Congo red and the like, many sulfonic acids of the aminoazobenzene class such as, for example Tropaeolin O, Orange III, Helianthin, Metanil Yellow, and the like, as well as certain salts of nitronaphthalene sulfonic acids, such as, for example Naphthol Yellow, and similar dyes.

In the case of certain dyes, such as Congo red, it is pointed out that they are destroyed readily by many phenolic resins as well as by strong acids and, therefore, must be added to the phenolic resin cement immediately before use. However, when a filler is employed in the resinous mixture such dyes can be, and preferably are, mixed with the filler which is inert to such dye and then added to the resin substance. Such dyes can also be added to the hardening agent when the latter is one which does not yield acid until brought into reaction with a phenolic resin. On the other hand, dyes which are not only unaffected by the phenolic resins but also by their components, that is, phenol or phenols, formaldehyde or its equivalents, such as paraformaldehyde, and catalysts, for instance sodium carbonate, may be added to the components or any of them before or during the formation of the resin. This applies, for instance, to most of the aminoazobenzene sulfonic acids mentioned above.

The previously described sulfonic acids of the amino-azo-benzene class are particularly useful since they possess a high resistance to phenolic resins, even if the latter contain free alkali, and change to a distinctly different color under the action of acid. Thus in an improperly mixed resin cement composition, streaks of the cement show clearly in the mixture thereby rendering it comparatively easy to determine the proper point where a mixture is produced that will give uniform hardness when set.

If desired, in place of using a substance which changes color upon contact with acid, a coloring material may be formed by reaction of a substance in the resinous composition and a substance associated with the hardening agent, thus, Prussian Blue or Turnbull's Blue may be formed and relied upon to indicate the type of mixing obtained. For example, Prussian Blue will be formed upon mixing the resinous composition and the hardening agent is potassium ferrocyanide is present in the resinous composition and ferric chloride is associated with or constitutes the hardening agent. In such a case, while the color change is not dependent on a reaction with the acid causing the hardening reaction, the formation of the dye will only be complete if and when the resinous composition and hardening agent are mixed together homogeneously.

In order that the subject matter of the invention may be entirely clear, three examples will now be described.

Example I

A phenolic resin of the formaldehyde class is produced by boiling 1000 parts phenol, 1000 parts 40% formaldehyde and 10 parts sodium hydroxide for thirty minutes under reflux, after which the mixture is cooled and the sodium hydroxide neutralized by the addition of dilute hydrochloric acid. The watery layer is then decanted and the liquid resin twice washed with distilled water after which the resin is distilled to the viscosity of glycerine when cooled.

A filler mixture consisting of 100 parts of siliceous earth is now mixed with 5-10 parts p-toluenesulfochloride and 0.1 part Congo Red. As this mixture can be stored indefinitely in a closed container a large supply thereof can be prepared and used as desired from time to time.

Now to prepare a suitable composition for cementing together the bricks and tiles of an acid proof or other structure such as a tank, vat or the like, the previously described filler mixture and liquid resin are mixed together in the proportion of 100 parts of the former to 50 parts of the latter.

Initially this mixture is red in color but due to the presence of hydrochloric acid produced by the reaction of the sulfochloride present in the filler mixture with the liquid resin, the color of the mixture soon changes to a deep blue or violet color except in the event that there are parts or areas that have not been properly mixed which will appear as streaks or areas of a different color. Depending upon the quantity of the sulfochloride present and upon the temperature, proper hardening of the composition requires from 2 to 24 or more hours and hence the said composition can be further mixed to eliminate any streaks before it is necessary to use the composition. Furthermore, as the hardening of the cement approaches the final stages the Congo Red dye is totally destroyed by the acid and, on finally hardening, the cement returns to its usual dark red color.

Example II

In this case, 0.05 part of Metanil Yellow is dissolved carefully in 1000 parts of the liquid resin described in Example I (supra). 50 parts of this solution are then thoroughly mixed with 100 parts of finely ground quartz filler producing a mixture which is usually gray in color with a slight orange tinge.

Immediately prior to using this phenolic resin cement, I stir into each 100 parts thereof 1 part of 33% alcoholic sulphuric acid with the result that the mixture immediately changes to a deep purple color and any parts or areas that have not been properly mixed together appear very distinctly. This cement retains this purple color for some time after final hardening but will turn red or brown at slightly elevated temperature.

Example III

In this instance, 5 grams of potassium-ferrocyanide are dissolved in 1000 grams of the liquid phenol resin described in Example I (supra). A filler mixture is then produced by mixing 3.9 grams of ferric chloride with 1750 grams of quartz powder containing 10% sulphamic acid.

The liquid resin solution and this filler mixture are then mixed together and the ferric chloride and potassium-ferro-cyanide constituents react immediately to form Prussian Blue. Thus, again, if the cement mixture is not uniform that fact will show very distinctly in contrast to the Prussian Blue color of the properly mixed parts or areas of the cement.

By the present invention, therefore, a synthetic phenol resin composition may be produced with absolute assurance that the hardening agent is uniformly mixed throughout the resin binder thereby enabling the disadvantages and difficulties resulting from improperly and non-uniformly mixed resinous cements to be overcome and eliminated. Furthermore, the nature of the invention is such that the uniformity of mixture of such cements can be readily determined by anyone, even those not skilled in the art of the preparation and use of phenolic resin cements.

The proportions of the various resinous mixtures for any particular case may be best determined by experiment in each instance as well as the duration of time desired or required for the mixture of the materials and hardening thereof. Furthermore, the present invention is not limited in application to resinous cements but can be employed with like effect in any phenolic resin composition in instances where an immediate indication of the uniform mixture of a hardening agent in the resin is desired.

Also, as previously stated, the invention may be employed with resins other than those of the phenol-formaldehyde class where such resin is convertible into hardened final product by reaction with acid or substance which yields acid upon reaction with such a resin and, accordingly, while various illustrative examples of the invention have been set forth and described, it is not intended that said invention be limited thereto but that changes and modifications may be embodied and incorporated therein within the scope of the annexed claims.

I claim:

1. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin which comprises incorporating with the mixture of said two components material which undergoes a distinct change of color dependent upon the mixing of said components.

2. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin which comprises mixing with one of said components a substance which undergoes a distinct change of color when said two components are mixed, and thereafter mixing said components.

3. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin by incorporating with the mixture of said two components material which undergoes a distinct change of color dependent upon the mixing of said components which comprises mixing with each component a substance capable of reacting with the substance mixed with the other component to produce a distinct change of color of the mixture when the two components are mixed together, and thereafter mixing said components.

4. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin which comprises mixing with one of said components a substance which undergoes a distinct change of color when the two components are mixed and the substance is subjected to the action of the acid causing the hardening of said resin, and thereafter mixing said components.

5. The method of claim 4 wherein the substance which undergoes a distinct change of color is an organic dyestuff.

6. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin which comprises mixing with said resin component an organic dyestuff which undergoes a distinct change of color when subjected to the action of the acid causing the hardening of said resin, and thereafter mixing said components.

7. In the preparation of a phenol-formaldehyde resin composition which is convertible into a hard infusible insoluble product upon the mixing of two components, one component being the phenol-formaldehyde resin and the other being an acid-hardening agent, the method of determining the extent or uniformity of distribution of such acid-hardening agent in said resin which comprises mixing with a hardening agent which yields acid when brought into action with said resin an organic dyestuff which undergoes a distinct change of color when subjected to the action of the acid liberated upon mixing the hardening agent causing the hardening thereof, and thereafter mixing said components.

8. In the preparation of a phenol-formaldehyde resin composition which is convertible into a hard, infusible, insoluble product upon the mixing of two components, one component being the phenol-formaldehyde resin and the other being an acid-hardening agent, the method of determining the extent or uniformity of distribution of such acid-hardening agent in said resin which comprises incorporating with the mixture of said two components a mixture of a filler and an organic dyestuff which undergoes a distinct change of color dependent upon the mixing of said components.

HANS H. LEBACH.